US012600002B2

(12) United States Patent
Sun et al.

(10) Patent No.: US 12,600,002 B2
(45) Date of Patent: Apr. 14, 2026

(54) INTERNAL COOLING SYSTEM FOR PRECISION TURNING AND CONTROL METHOD THEREOF

(71) Applicant: DALIAN UNIVERSITY OF TECHNOLOGY, Dalian (CN)

(72) Inventors: Yuwen Sun, Dalian (CN); Shuyang Yan, Dalian (CN); Shutao Qi, Dalian (CN); Jinting Xu, Dalian (CN)

(73) Assignee: DALIAN UNIVERSITY OF TECHNOLOGY, Dalian (CN)

( * ) Notice: Subject to any disclaimer, the term of this patent is extended or adjusted under 35 U.S.C. 154(b) by 531 days.

(21) Appl. No.: 18/308,248

(22) Filed: Apr. 27, 2023

(65) Prior Publication Data

US 2023/0405749 A1 Dec. 21, 2023

Related U.S. Application Data

(63) Continuation-in-part of application No. PCT/CN2022/099654, filed on Jun. 20, 2022.

(51) Int. Cl.
*B23Q 11/10* (2006.01)
(52) U.S. Cl.
CPC ................................ *B23Q 11/1038* (2013.01)
(58) Field of Classification Search
CPC ............................ B23Q 11/1038; B23B 27/10
See application file for complete search history.

(56) References Cited

U.S. PATENT DOCUMENTS

| | | | | | |
|---|---|---|---|---|---|
| 8,047,748 | B2 * | 11/2011 | Endres | .................. | B23B 27/145 |
| | | | | | 407/115 |
| 2006/0053987 | A1 * | 3/2006 | Ghosh | ..................... | B23B 27/10 |
| | | | | | 82/1.11 |
| 2012/0087747 | A1 * | 4/2012 | Fang | ......................... | B23C 5/28 |
| | | | | | 407/11 |
| 2020/0338649 | A1 * | 10/2020 | Wang | ...................... | B23B 27/10 |

(Continued)

FOREIGN PATENT DOCUMENTS

| | | |
|---|---|---|
| CN | 104589151 A | 5/2015 |
| CN | 106312682 A | 1/2017 |
| CN | 107150256 A | 9/2017 |

(Continued)

*Primary Examiner* — Mong-Shune Chung
(74) *Attorney, Agent, or Firm* — MUNCY, GEISSLER, OLDS & LOWE, P.C.

(57) ABSTRACT

For an internal cooling system for precision turning and a control method thereof, internal cooling channels are machined in turning tool, and internal cooling sleeves are used to realize the communication between each hydraulic branch circuit and internal cooling channels of turning tool; a tool contact area calculation model is established to master the change rule of the contact state in whole-domain turning process of a curved surface component; the temperature and flow rate of a cooling medium at a liquid outlet of an air-cooled water cooler are set according to the material property and cutting conditions of the curved surface component; an electromagnetic control circuit is used to control the on-off of electromagnetic directional valves, so as to adjust the conduction sequence and action time of each hydraulic branch circuit, and further realize the localized, directional and accurate cooling of a curved surface component cutting tool.

8 Claims, 7 Drawing Sheets

(56)          References Cited

U.S. PATENT DOCUMENTS

2021/0101214 A1*   4/2021   Fraese ........................ B23C 5/28
2024/0123516 A1*   4/2024   Hecht ..................... B23B 27/10

FOREIGN PATENT DOCUMENTS

| CN | 109641281  | A | 4/2019 |
| CN | 110899740  | A | 3/2020 |
| CN | 112517942  | A | 3/2021 |
| JP | 0825110    | A | 1/1996 |
| JP | 2014231097 | A | 11/2014 |

* cited by examiner

Coverage area of cooling medium in contact state 1

Coverage area of cooling medium in contact state 2

INTERNAL COOLING SYSTEM FOR PRECISION TURNING AND CONTROL METHOD THEREOF

CROSS REFERENCE TO RELATED APPLICATIONS

This application is a Continuation-in-Part of co-pending Application No. PCT/CN2022/099654, filed on Jun. 20, 2022, and for which priority is claimed under 35 U.S.C. § 120, the entire contents of all of which are hereby incorporated by reference.

TECHNICAL FIELD

The present invention belongs to the technical field of cooling and lubrication for turning of curved surface components, and particularly relates to a precise internal cooling system and a control method thereof.

BACKGROUND

A series of high-performance curved surface components are applied in the fields of energy power, aerospace and so on. Due to the small wall thickness and large profile size of the curved surface components, the material removal rate is high, and the problem of tool wear is serious. In addition, the curved surface components are generally made of hard-to-machine materials such as pure iron, titanium alloy and high-strength steel, and the friction in the contact areas of the tool with chips and workpieces is intense in a cutting process, so that the service life of a cutting tool is further shortened, and the forming precision and machining efficiency of parts are severely limited.

Currently, tool design, parameter optimization, workpiece modification, cooling and lubrication are common methods for reducing the tool wear. Cooling and lubrication directly takes away most of the heat generated during cutting by using a flowing cooling medium, reduces the friction in the contact areas and improves the effect of chip breaking. This method is simple and easy to implement but has a most obvious effect on reducing the tool wear. In a group of related researches, an internal cooling method can directly deliver the cooling medium into a tool contact area through a tool internal cooling hole, and has better cooling and lubrication functions and chip discharging effect. Compared with the traditional casting type cooling method, the internal cooling method is beneficial to further prolonging the service life of the cutting tool. An internal cooling turning tool using a liquid spraying pin to spray cooling liquid is disclosed by Zhuzhou Cemented Carbide Cutting Tools Co., Ltd. in the utility model patent CN201520044250.5, which solves the problem of internal cooling and lubrication of the rake face of the tool in a cutting process. An "ultralow temperature medium hollow transmission type turning tool with high cooling efficiency" is disclosed by Dalian University of Technology in the invention patent CN202011316683.3, which realizes the synchronous cooling of the rake and flank faces of the cutting tool by designing a cooling channel in the turning tool, and solves the problem of cooling medium leakage during use.

According to the existing technical solution, the problem of synchronous cooling of different cutting areas by the cooling medium in a turning process can be solved. However, the contact states of the tool with workpieces and chips will change in real time with the cutting position in the whole-domain turning process of a curved surface component. The action area of the cooling medium of the existing internal cooling system is fixed, so that the cooling efficiency of the tool is different in different contact conditions, and even part of the tool contact area is not cooled or lubricated in the whole cutting process. In addition, the action direction of the cooling medium on the rake face of the tool is constant in the current technical solution, so that the cooling medium is ineffective when part of the curved surface component is in turning state, and additional impact force is generated to deteriorate the flow direction of chips and cause difficulties in chip breaking.

SUMMARY

In view of the defects in the prior art, the present invention provides a precise internal cooling system for turning of curved surface components and a control method thereof, so as to solve the problem that the existing internal cooling system cannot meet the optimal tool cooling requirement in the turning process of curved surface components.

The technical solution of the present invention is as follows:

An internal cooling system for precision turning, comprising a hydraulic circuit, an internal cooling turning tool and an electromagnetic control circuit;

The hydraulic circuit comprises a hydraulic main circuit and several hydraulic branch circuits, and the main circuit comprises a hydraulic source with overflow valve 1, a filter 2, a pressure gauge 3, an adjustable throttle valve 4 and an air-cooled water cooler 5, wherein the hydraulic source with overflow valve 1, the filter 2, the adjustable throttle valve 4 and the air-cooled water cooler 5 are connected in sequence through hydraulic hoses, and the pressure gauge 3 is arranged between the filter 2 and the adjustable throttle valve 4; pipelines derived from the air-cooled water cooler 5 are divided into a first hydraulic branch circuit, a second hydraulic branch circuit and a third hydraulic branch circuit, wherein the first hydraulic branch circuit, the second hydraulic branch circuit and the third hydraulic branch circuit are respectively controlled by a first electromagnetic directional valve 6, a second electromagnetic directional valve 7 and a third electromagnetic directional valve 8, and are connected with the hydraulic main circuit through ferrule joints;

A first internal cooling channel 91, a second internal cooling channel 93 and a third internal cooling channel 95 are formed in the internal cooling turning tool 9, and first pipe threads 92, second pipe threads 94 and third pipe threads 96 are respectively formed at the tail parts of the three channels; the pipe threads are matched with external threads at the tail parts of internal cooling sleeves 10, so as to realize the communication between each hydraulic branch circuit and the internal cooling channels of the turning tool; platen screws are penetrated through screw mounting holes 112 to fix a platen 11 on the internal cooling turning tool 9, and pressing force between the platen 11 and a turning insert 12 is adjusted to ensure that the turning insert 12 is tightly pressed against the internal cooling turning tool 9; a first internal cooling hole 97, a second internal cooling hole 98 and a third internal cooling hole 99 are formed in the tool nose of the internal cooling turning tool 9, and a cooling medium is sprayed out through the internal cooling holes to cool and lubricate the flank face of the turning insert 12; a first nozzle 111, a second nozzle 113 and a third nozzle 114 which are communicated with the internal cooling channels are arranged in the platen 11, and the cooling medium is sprayed out through the nozzles to cool and lubricate the rake face of the turning insert 12.

Further, the electromagnetic directional valves are normally closed two-position two-way valves.

Further, the ferrule joints are four-way and are made of stainless steel.

Further, the cooling medium sprayed out through the first internal cooling hole 97, the second internal cooling hole 98 and the third internal cooling hole 99 can respectively meet the cooling requirements of the major flank face, the flank face near to the tool nose arc and the minor flank face.

A control method of the internal cooling system for precision turning, comprising the following steps:

Step 1, conducting parameterization representation for cutting edges of the turning tool; obtaining the coordinates of partial data points located on a major cutting edge, a minor cutting edge and a tool nose arc profile of the turning insert 12, and using a cubic non-uniform rational B spline to construct a turning tool cutting edge profile curve passing through each data point;

Step 2, analyzing a time-varying contact state related to a tool pose; firstly, adjusting the initial pose of the tool in a workpiece coordinate system according to the actual cutting process of a curved surface; establishing a tool coordinate system, wherein the XOY plane of the coordinate system is located in a cutting plane, the origin of the coordinate system is located at the center of symmetry of a rhombic insert, and the Y axis is collinear with the symmetric axes of the major cutting edge and the minor cutting edge; discretizing the turning tool cutting edge profile curve into a point set $P^o$ in the tool coordinate system; establishing a workpiece coordinate system, wherein the X'OY' plane of the workpiece coordinate system is also located in the cutting plane, the origin of the coordinate system is located at the intersection point of a workpiece rotation axis and a workpiece clamping surface, and the Y' axis is collinear with the workpiece rotation axis; conducting a matrix translation operation to make the turning tool position point, namely the center of the tool nose arc, coincide with the origin of the workpiece coordinate system, and conducting a matrix rotation operation to make the initial included angle between the major cutting edge of the tool and the Y' axis become $\varphi_1$, wherein the value range of $\varphi_1$ is 60°-120°; after the rotation and translation operations, determining a discrete point set $P^t$ for the cutting edge profile curve in the workpiece coordinate system by the following formula:

$$P^t = \begin{bmatrix} \cos\left(\varphi_1 + \dfrac{k_\theta}{2}\right) & -\sin\left(\varphi_1 + \dfrac{k_\theta}{2}\right) & 0 \\ \sin\left(\varphi_1 + \dfrac{k_\theta}{2}\right) & \cos\left(\varphi_1 + \dfrac{k_\theta}{2}\right) & 0 \\ 0 & 0 & 1 \end{bmatrix} \begin{bmatrix} 1 & 0 & -T_x \\ 0 & 1 & -T_y \\ 0 & 0 & 1 \end{bmatrix} P^o \tag{1}$$

Where $k_\theta$ is the included angle between the major cutting edge and the minor cutting edge of the turning tool, $T_x$ is the x-coordinate of the center of the tool nose arc in the tool coordinate system, and $T_y$ is the y-coordinate of the center of the tool nose arc in the tool coordinate system;

Secondly, calculating the intersection points of the cutting edges with a machined surface and a work surface, wherein the profile distance between two points is the contact length of the cutting edges in the current tool pose, which changes along with the change of the tool pose in the turning process of a curved surface component; two intersection points are formed between a cutting edge profile and a curved surface profile, wherein the intersection point of the major cutting edge or the adjacent tool nose arc with the curved surface profile is $P_N$, and the intersection point of the minor cutting edge or the adjacent tool nose arc with the curved surface profile is $P_G$, and point $P_N$ is the intersection point of the tool and the work surface; defining an auxiliary straight line according to the geometry of the curved surface component and cutting parameters, wherein the intersection point of the auxiliary straight line and each cutting edge of the turning tool is the intersection point $P_M$ of the tool and the machined surface; determining the slope of the auxiliary straight line by the following formula:

$$k = \tan\left[\theta_i - arctan\left(\frac{f}{2R - 2ap}\right)\right] \tag{2}$$

Where $\theta_i$ is the included angle between the normal vector of the curved surface and the X' axis in the current tool pose, ap is the cutting depth of the tool, f is the feed rate of the tool in per rotation, and R is the curvature radius of the work surface in the current cutting position;

Finally, discretizing a motion track of the tool, and traversing and calculating the contact state of the tool at each discrete tool position point to master the moving rule and moving range of the contact area of the tool in the turning process of the curved surface component;

Step 3, decomposing the contact state based on the analysis of the coverage area of the cooling medium; selecting the type of the cooling medium according to the material property of the curved surface component, and adjusting the temperature and flow rate of the cooling medium by the air-cooled water cooler 5 and the adjustable throttle valve 4; dividing the moving range of the whole contact area into three parts in sequence according to the spraying position and spraying range of the cooling medium from the pipeline of each channel, and defining the three parts as contact state 1, contact state 2 and contact state 3 respectively; calculating the cutting durations of the three contact states according to the tool feed speed and the geometrical characteristics of the curved surface component, and recording the cutting durations as $t_1$, $t_2$ and $t_3$ respectively; therefore, the corresponding times after the end of the three contact states are respectively $T1=t_1$, $T3=t_1+t_2$ and $T5=t_1+t_2+t_3$;

Step 4, designing an electromagnetic control system oriented to an optimal tool cooling efficiency; completing the action control of the hydraulic circuit based on a designed electromagnetic control system, and pressing down a normally open key switch S, thus an electromagnetic coil Y1 is connected, and an indicator light L1 is lightened; at this moment, the first electromagnetic directional valve 6 is switched from a normally closed state to a working state, and the hydraulic main circuit is communicated with the first hydraulic branch circuit; the cooling medium passes through the first internal cooling channel 91, one part of the cooling medium passes through the cooling channel in the platen 11 and is sprayed out through the first nozzle 111 to realize the functions of cooling and chip breaking of the major rake face, and the other part of the cooling medium is sprayed out through the first internal cooling hole 97 to solve the problem of cooling and lubrication of the major flank face; after a duration T1, a time-delay closing coil C1 is switched on, an associated normally open contact C11 is closed, an electromagnetic coil Y2 is switched on, an indicator light L2 is lightened, and a time-delay closing coil C2 starts timing; at this moment, the second electromagnetic directional valve 7 is switched from a normally closed state to a working state, and the hydraulic main circuit is communicated with the second hydraulic branch circuit; the cooling medium passes through the second internal cooling channel 93, one part of the cooling medium passes through the cooling channel in the platen 11 and is sprayed out through the second nozzle 113 to realize the functions of cooling and chip breaking of the rake face near to the tool nose arc, and the other part of the cooling medium is sprayed out through the second internal cooling hole 98 to solve the problem of cooling and lubrication of the flank face near to the tool nose arc; in a transition process of the two contact states, the first hydraulic branch circuit and the second hydraulic branch circuit are communicated simultaneously, and the duration is T2;

Then the time-delay closing coil C2 is switched on, an associated normally closed contact C22 is switched off, the indicator light L1 is extinguished, the electromagnetic coil Y1 is powered off, the first electromagnetic directional valve 6 is reset under the action of a spring and restored to the normally closed state, and at this moment, only the second hydraulic branch circuit is communicated; after the hydraulic circuit is in continuous communication for a time of T3, a time-delay closing coil C3 is switched on, an associated normally open contact C33 is closed, an electromagnetic coil Y3 is switched on, an indicator light L3 is lightened, and a time-delay closing coil C4 starts timing; at this moment, the third electromagnetic directional valve 8 is switched from a normally closed state to a working state, and the hydraulic main circuit is communicated with the third hydraulic branch circuit; the cooling medium passes through the third internal cooling channel 95, one part of the cooling medium passes through the cooling channel in the platen 11 and is sprayed out through the third nozzle 114 to realize the functions of cooling and chip breaking of the minor rake face, and the other part of the cooling medium is sprayed out through the third internal cooling hole 99 to solve the problem of cooling and lubrication of the minor flank face; in a transition process of the two contact states, the second hydraulic branch circuit and the third hydraulic branch circuit are communicated simultaneously, and the duration is T4;

Then the time-delay closing coil C4 is switched on, an associated normally closed contact C44 is switched off, the indicator light L2 is extinguished, the electromagnetic coil Y2 is powered off, the second electromagnetic directional valve 7 is reset under the action of a spring and restored to the normally closed state, and at this moment, only the third hydraulic branch circuit is communicated; after the hydraulic circuit is in continuous communication for a time of T5, a time-delay closing coil C5 is switched on, an associated normally closed contact C55 is switched off, the indicator light L3 is extinguished, the electromagnetic coil Y3 is powered off, and the third electromagnetic directional valve 8 is reset under the action of a spring and restored to the normally closed state; at this moment, the whole-domain turning process of the curved surface component in the condition of the current cutting parameters is completed, the electromagnetic control circuit is reset, and none of the hydraulic branch circuits is communicated; the turning tool is retreated to the initial position, the action process of the hydraulic circuit can be repeated by pressing down the normally open key switch S again before the next turning is started, and the operation is continued until the turning of the curved surface component is completed.

Further, the characteristic point coordinates of the cutting edge profile are measured by an optical microscope.

Further, the adjusting range of the opening of the adjustable throttle valve 4 is 0.5-1.

Further, the adjusting range of the liquid outlet temperature of the air-cooled water cooler 5 is 0° C.-50° C.

The present invention has the following beneficial effects:

The present invention designs a precise internal cooling system oriented to the turning process of curved surface components, and proposes a control method of the internal cooling system oriented to the optimal tool cooling efficiency. The type, the flow rate, the temperature, the action position and the action time of the cooling medium of the internal cooling system are customized according to the change rule of the tool contact state in the whole-domain turning process of the curved surface component, so that the internal cooling system has the capacity of differential cooling in different contact areas, improves the use efficiency of the cooling medium, and realizes the localized, directional and accurate cooling of a curved surface component cutting tool, which can effectively reduce the tool wear in the turning process and prolong the service life of the tool.

In the figures: 1. hydraulic source with overflow valve; 2. filter; 3. pressure gauge; 4. adjustable throttle valve; 5. air-cooled water cooler; 6. first electromagnetic directional valve; 7. second electromagnetic directional valve; 8. third electromagnetic directional valve; 9. internal cooling turning tool; 91. first internal cooling channel; 92. first pipe threads; 93. second internal cooling channel; 94. second pipe threads; 95. third first internal cooling channel; 96. third pipe threads;

97. first internal cooling hole; 98. second internal cooling hole; 99. third internal cooling hole; 10. internal cooling sleeve; 11. platen; 111. first nozzle; 112. screw mounting hole; 113. second nozzle; 114. third nozzle; and 12. turning insert.

DETAILED DESCRIPTION

In order to make the purpose, features, and advantages of the present invention more obvious and understandable, the present invention is further described below with reference to the drawings and in conjunction with specific embodiments, so that those skilled in the art can implement the present invention with reference to the words of the description. The protection scope of the present invention is not limited to the detailed description. Apparently, the embodiments described below are merely part of the embodiments of the present invention, not all of the embodiments. Based on the embodiments in the present invention, all other embodiments obtained by those ordinary skilled in the art without contributing creative labor will belong to the protection scope of the present invention.

An internal cooling system for precision turning, mainly comprising a hydraulic circuit, an internal cooling turning tool and an electromagnetic control circuit.

Figure 1:
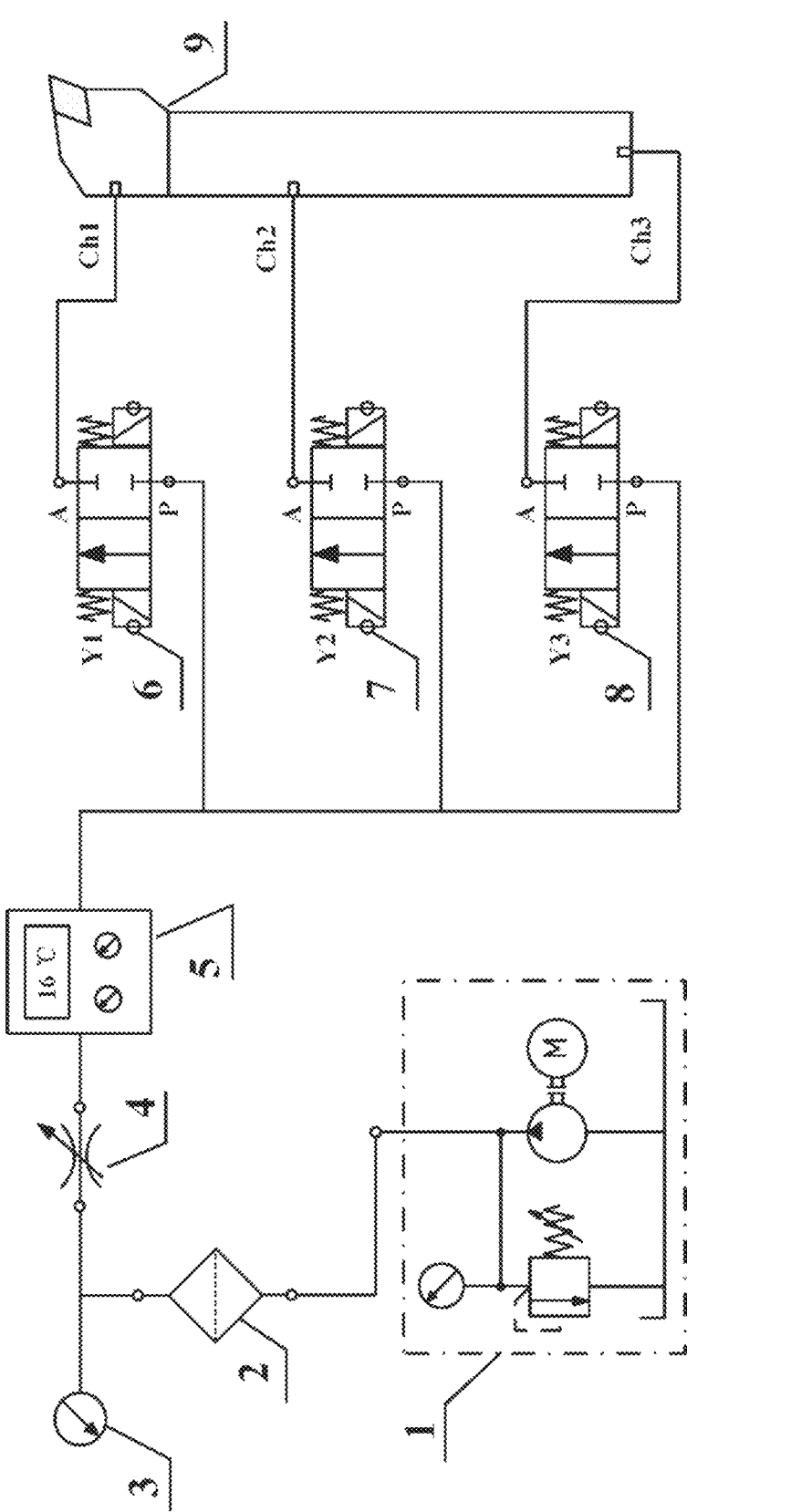
FIG. 1 is a hydraulic circuit diagram of an internal cooling system for turning of curved surface components.
Figure 2:
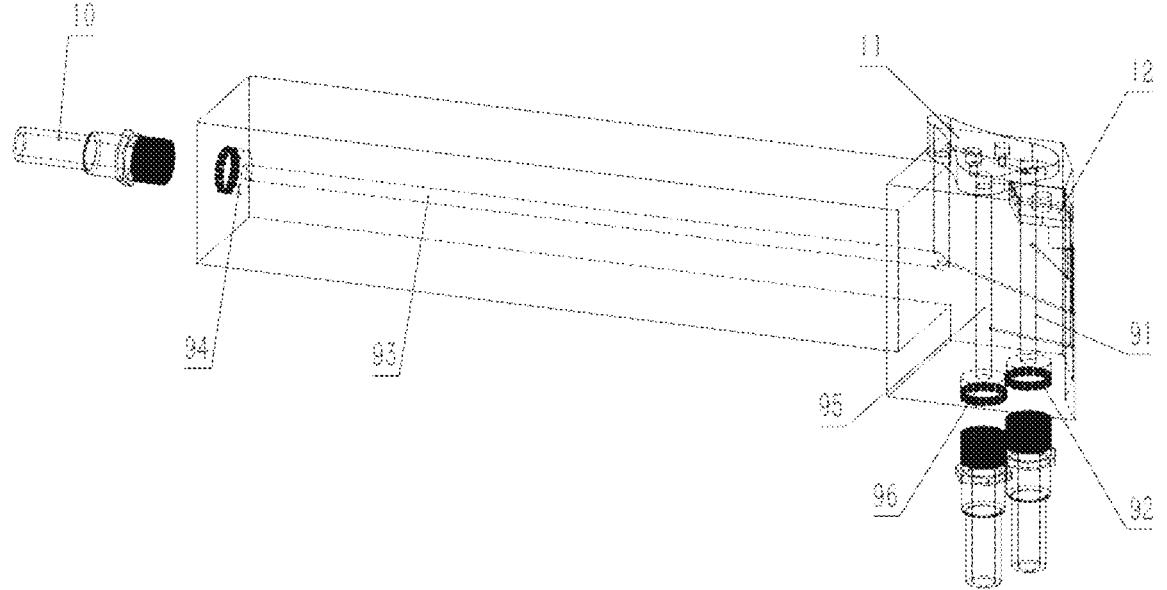
FIG. 2 is a schematic diagram of the overall structure of an internal cooling turning tool.
Figure 3:
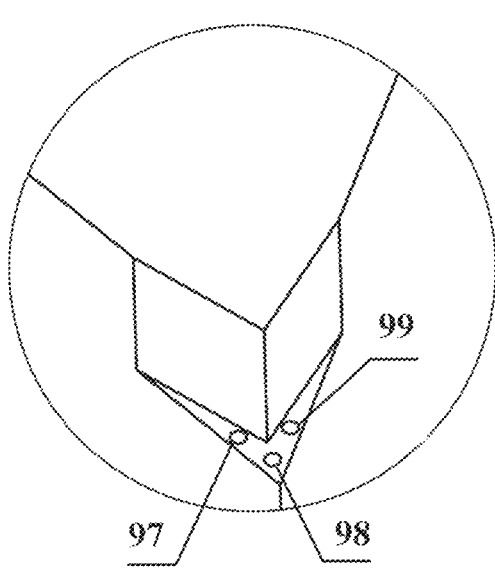
FIG. 3 is a partial enlarged view for the tool tip of an internal cooling turning tool.
Figure 4:
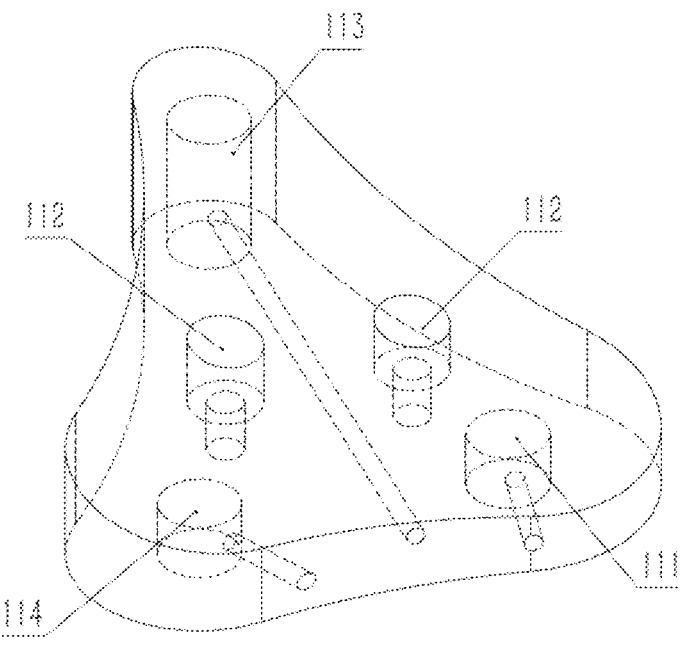
FIG. 4 is a schematic diagram of the overall structure of a platen.

As shown in FIG. 1, the hydraulic main circuit comprises a hydraulic source with overflow valve 1, a filter 2, a pressure gauge 3, an adjustable throttle valve 4 and an air-cooled water cooler 5 which are connected in sequence through hydraulic hoses. A first hydraulic branch circuit, a second hydraulic branch circuit and a third hydraulic branch circuit are respectively controlled by a first electromagnetic directional valve 6, a second electromagnetic directional valve 7 and a third electromagnetic directional valve 8, are independent from each other, and are connected with the hydraulic main circuit through ferrule joints;

As shown in FIG. 2, a first internal cooling channel 91, a second internal cooling channel 93 and a third internal cooling channel 95 are formed in the internal cooling turning tool 9, and first pipe threads 92, second pipe threads 94 and third pipe threads 96 are respectively formed at the tail parts of the channels. The pipe threads are matched with external threads at the tail parts of internal cooling sleeves 10, so as to realize the communication between each hydraulic branch circuit and the internal cooling channels of the turning tool. Platen screws are penetrated through screw mounting holes 112 to fix a platen 11 on the internal cooling turning tool 9, and pressing force between the platen 11 and a turning insert 12 is adjusted to ensure that the turning insert 12 is tightly pressed against the internal cooling turning tool 9. A first internal cooling hole 97, a second internal cooling hole 98 and a third internal cooling hole 99 are formed in the tool nose of the internal cooling turning tool 9, the distribution positions of the internal cooling holes are shown in FIG. 3, and a cooling medium is sprayed out through the internal cooling holes to cool and lubricate the flank face of the turning insert 12. As shown in FIG. 4, a first nozzle 111, a second nozzle 113 and a third nozzle 114 which are communicated with the internal cooling channels are arranged in the platen 11, and the cooling medium is sprayed out through the nozzles to cool and lubricate the rake face of the turning insert 12.

Figure 5:
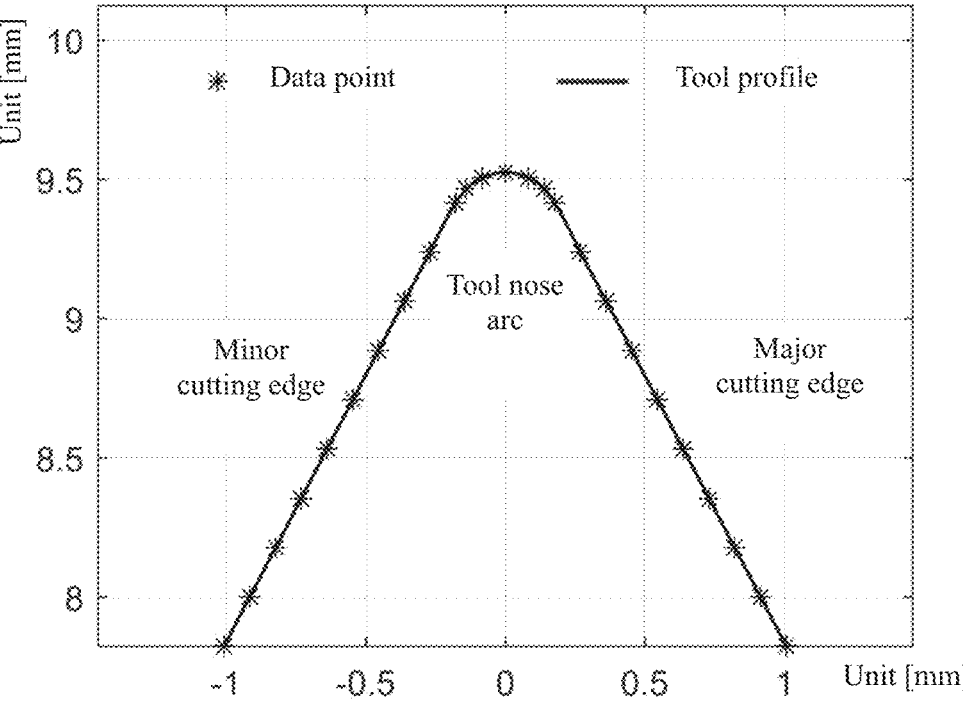
FIG. 5 is a cutting edge profile diagram of an internal cooling turning tool.

In combination with the contact state analysis in the whole-domain turning process of the curved surface component, a control method of the internal cooling system is provided to meet the optimal tool cooling requirement in different contact states. The curved surface component is made of the pure iron material, the structure is a hemispherical surface with a flange, the length of the flange is 20 mm, the thickness of the flange is 10 mm, the inner diameter of the spherical surface is 120 mm, and the wall thickness of the spherical surface is 2.4 mm. The cutting depth of the tool is 60 um, the feed rate is 0.06 mm/r, and the spindle speed is 300 r/min. The control method comprises the following specific steps:

Step 1, conducting parameterization representation for cutting edges of the turning tool. As shown in FIG. 5, obtaining the coordinates of partial data points located on a major cutting edge, a minor cutting edge and a tool nose arc profile of the turning insert 12, and using a cubic non-uniform rational B spline to construct a turning tool cutting edge profile curve passing through each partial data point.

Step 2, analyzing a time-varying contact state related to a tool pose. Firstly, adjusting the initial pose of the tool in a workpiece coordinate system according to the actual cutting process of a curved surface component. establishing a tool coordinate system, wherein the XOY plane of the coordinate system is located in a cutting plane, the origin of the coordinate system is located at the center of symmetry of a rhombic insert, and the Y axis is collinear with the symmetric axes of the major cutting edge and the minor cutting edge; discretizing the turning tool cutting edge profile curve into a point set $P^o$ in the tool coordinate system; establishing a workpiece coordinate system, wherein the X'OY' plane of the workpiece coordinate system is also located in the cutting plane, the origin of the coordinate system is located at the intersection point of a workpiece rotation axis and a workpiece clamping surface, and the Y' axis is collinear with the workpiece rotation axis; conducting a matrix translation operation to make the turning tool position point, namely the center of the tool nose arc, coincide with the origin of the workpiece coordinate system, and conducting a matrix rotation operation to make the initial included angle between the major cutting edge of the tool and the Y' axis become $\varphi_1 = 92.5°$. After the rotation and translation operations, determining a discrete point set $P'$ for the cutting edge profile curve in the workpiece coordinate system by the following formula:

$$P' = \begin{bmatrix} \cos\left(\varphi_1 + \frac{k_\theta}{2}\right) & -\sin\left(\varphi_1 + \frac{k_\theta}{2}\right) & 0 \\ \sin\left(\varphi_1 + \frac{k_\theta}{2}\right) & \cos\left(\varphi_1 + \frac{k_\theta}{2}\right) & 0 \\ 0 & 0 & 1 \end{bmatrix} \begin{bmatrix} 1 & 0 & -T_x \\ 0 & 1 & -T_y \\ 0 & 0 & 1 \end{bmatrix} P^o \tag{1}$$

Where $k_\theta$ is the included angle between the major cutting edge and the minor cutting edge of the turning tool, $T_x$ is the x-coordinate of the center of the tool nose arc in the tool coordinate system, and $T_y$ is the y-coordinate of the center of the tool nose arc in the tool coordinate system. In the selected cutting condition, $k_\theta=55°$, $T_x=0$ mm, and $T_y=9.324$ mm.

Figure 6:
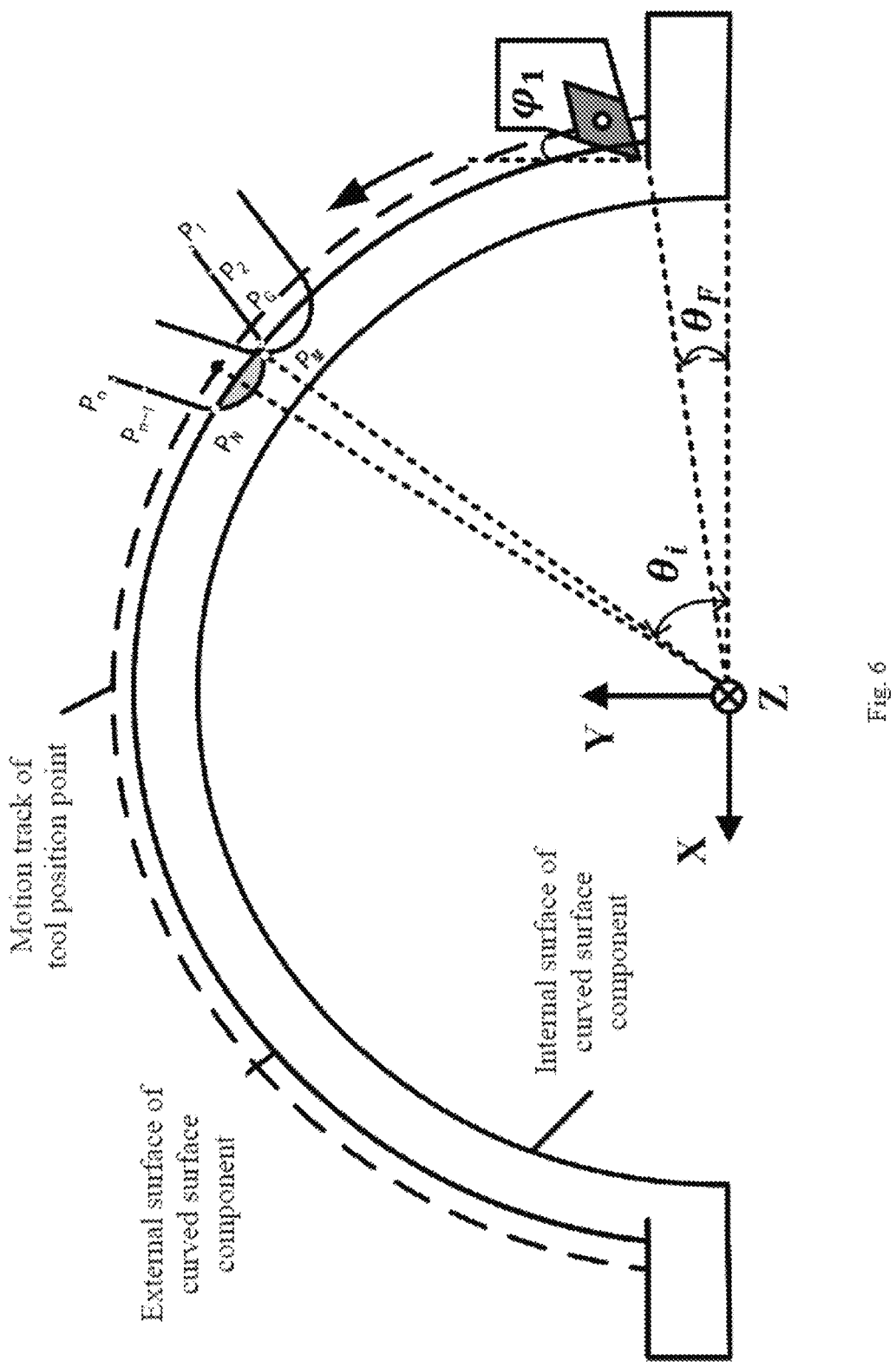
FIG. 6 is a schematic diagram showing the change of contact state in the turning process of a curved surface component.

Secondly, calculating the intersection points of the cutting edges with a machined surface and a work surface, wherein the profile distance between two points is the contact length of the cutting edges in the current tool pose, which changes along with the change of the tool pose in the turning process of a curved surface component. As shown in FIG. 6, two intersection points are formed between a cutting edge profile and a curved surface profile, wherein the intersection point of the major cutting edge or the adjacent tool nose arc with the curved surface profile is $P_N$, and the intersection point of the minor cutting edge or the adjacent tool nose arc with the curved surface profile is $P_G$, point $P_N$ is the intersection point of the tool and the work surface, and main groove wear is easy to occur here. Defining an auxiliary straight line according to the geometry of the curved surface component and cutting parameters, wherein the intersection point of the auxiliary straight line and each cutting edge of the turning tool is the intersection point $P_M$ of the tool and the machined surface, and auxiliary groove wear is easy to occur here. Determining the slope of the auxiliary straight line by the following formula:

$$k = \tan\left[\theta_i - arctan\left(\frac{f}{2R - 2ap}\right)\right] \qquad (2)$$

Where $\theta_i$ is the included angle between the normal vector of the curved surface and the X' axis in the cutting plane, ap is the cutting depth of the tool, f is the feed rate of the tool in per rotation, and R is the curvature radius of the work surface in the current cutting position. In the selected cutting condition, R is 122.4 mm.

Finally, discretizing a motion track of the tool, and traversing and calculating the contact state of the tool at each discrete tool position point to master the moving rule and moving range of the contact area of the tool in the turning process of the curved surface component.

Figure 7:
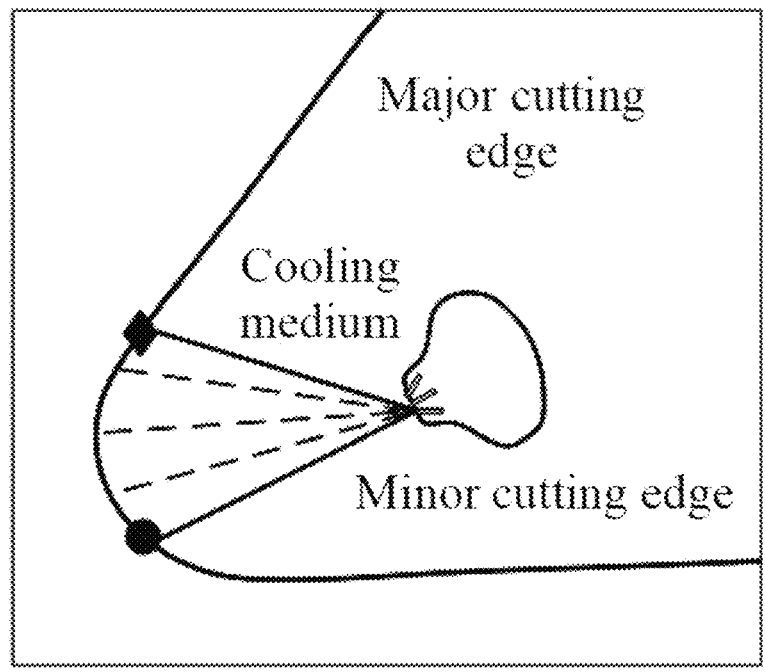
FIGS. 7(*a*)-7(*c*) are diagrams showing the cooling effect in different contact states, wherein FIG. 7(*a*) shows the cooling effect in contact state 1, FIG. 7(*b*) shows the cooling effect in contact state 2, and FIG. 7(*c*) shows the cooling effect in contact state 3.
Figure 7:
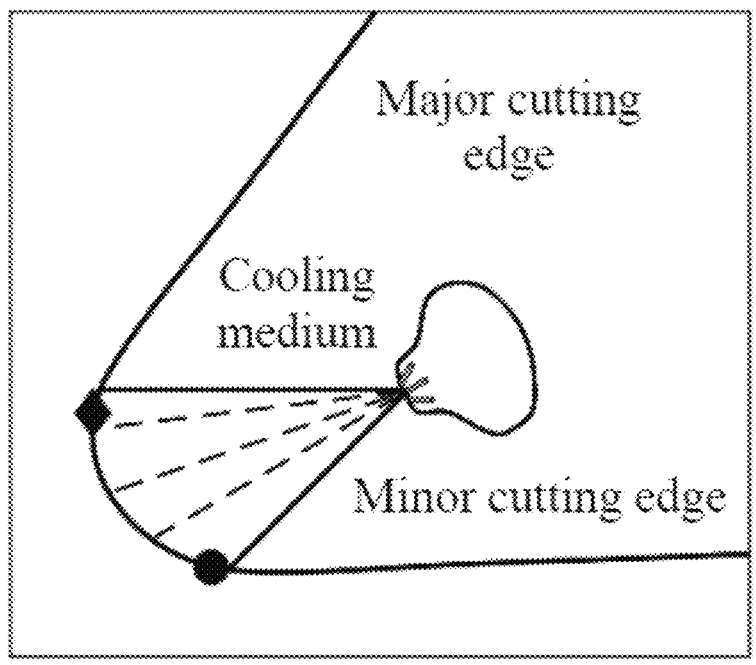
Figure 7:
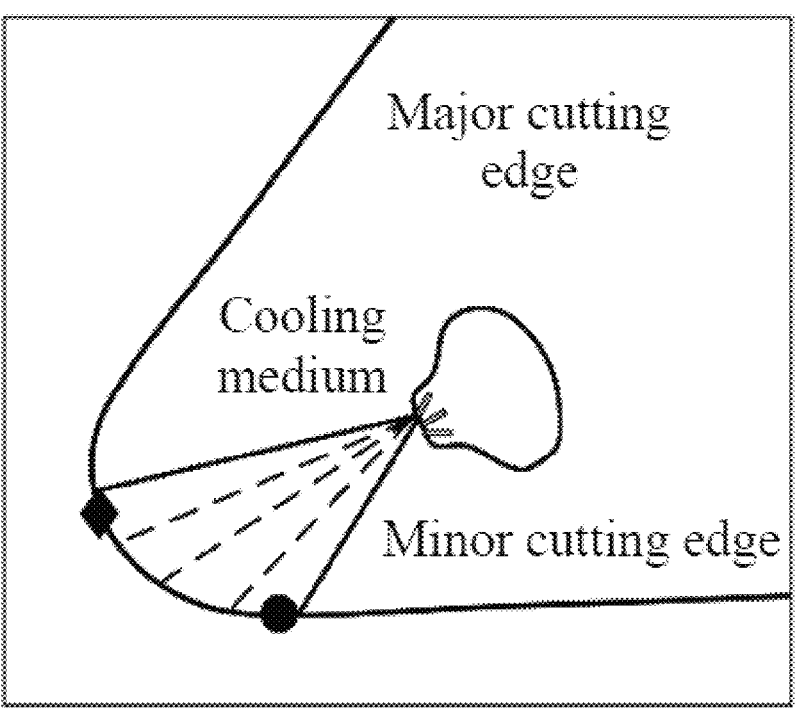

Step 3, decomposing the contact state based on the analysis of the coverage area of the cooling medium. preferably selecting a water-based lubricant as the cooling medium according the material property of the curved surface component, setting the liquid outlet temperature of the air-cooled water cooler to 16° C., and setting the opening of the adjustable throttle valve 4 to 0.7. As shown in FIGS. 7(a)-7(c), dividing the moving range of the whole contact area into three parts in sequence according to the spraying position and spraying range of the cooling medium from each pipeline, and defining the three parts as contact state 1, contact state 2 and contact state 3 respectively. In the current cutting condition, the variation ranges of the central angles corresponding to the three contact states are [4.7°, 38.2°], [38.2°, 64.9°] and [64.9°, 90°] respectively, and the corresponding cutting durations are $t_1$=251.57 s, $t_2$=200.50 s and $t_3$=188.49 s respectively. Therefore, the corresponding times after the end of the three contact states are respectively T1=251.57 s, T3=452.07 s and T5=640.56 s.

Figure 8:
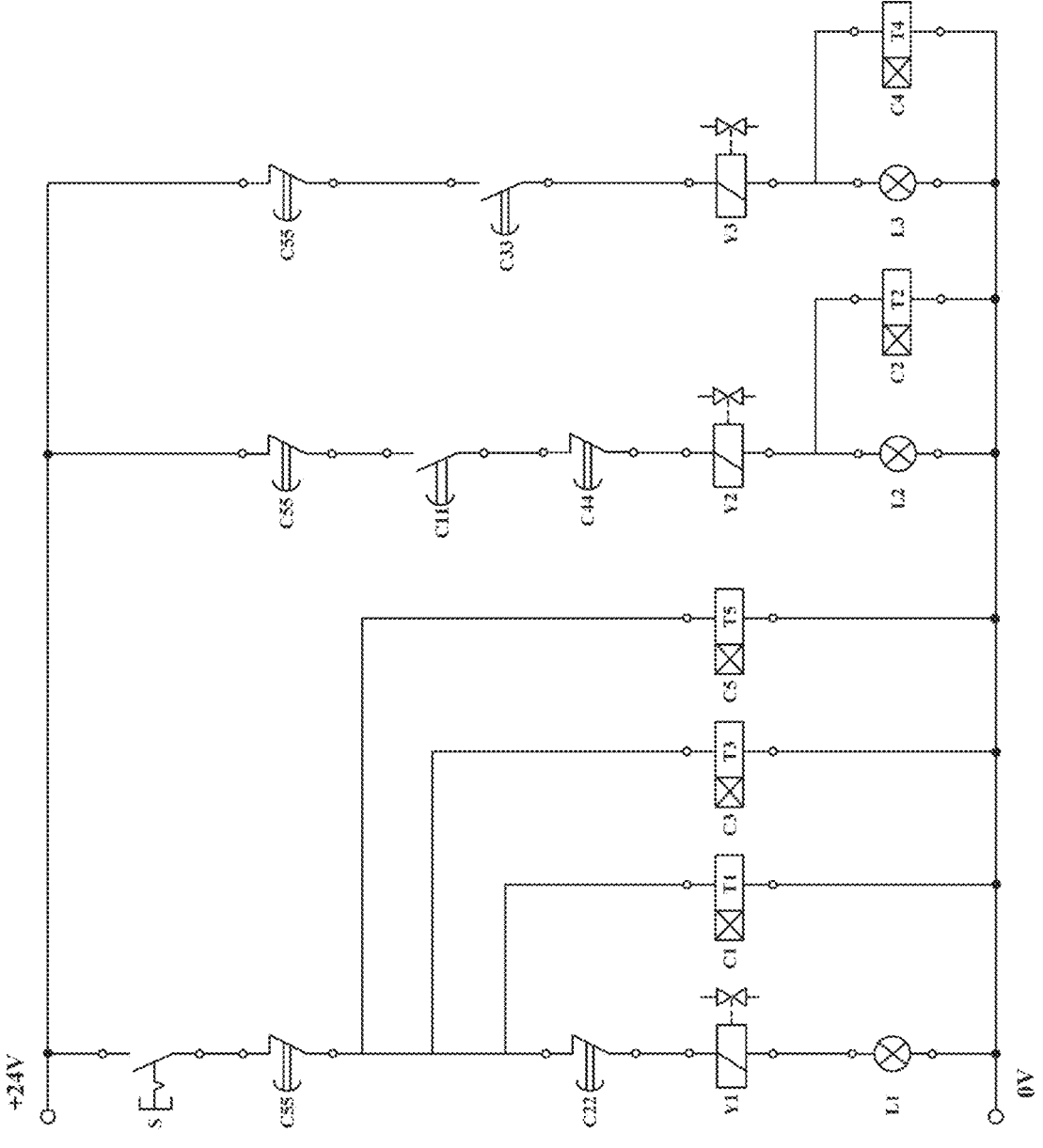
FIG. 8 is an electromagnetic control schematic diagram of an internal cooling turning system.

Step 4, designing an electromagnetic control system oriented to an optimal tool cooling efficiency. As shown in FIG. 8, completing the action control of the hydraulic circuit based on a designed electromagnetic control system, and pressing down a normally open key switch S, thus an electromagnetic coil Y1 is connected, and an indicator light L1 is lightened. At this moment, the first electromagnetic directional valve 6 is switched from a normally closed state to a working state, and the hydraulic main circuit is communicated with the first hydraulic branch circuit. The cooling medium passes through the first internal cooling channel 91, one part of the cooling medium passes through the cooling channel in the platen 11 and is sprayed out through the first nozzle 111 to realize the functions of cooling and chip breaking of the major rake face, and the other part of the cooling medium is sprayed out through the first internal cooling hole 97 to solve the problem of cooling and lubrication of the major flank face. After a duration T1, a time-delay closing coil C1 is switched on, an associated normally open contact C11 is closed, an electromagnetic coil Y2 is switched on, an indicator light L2 is lightened, and a time-delay closing coil C2 starts timing. At this moment, the second electromagnetic directional valve 7 is switched from a normally closed state to a working state, and the hydraulic main circuit is communicated with the second hydraulic branch circuit. The cooling medium passes through the second internal cooling channel 93, one part of the cooling medium passes through the cooling channel in the platen 11 and is sprayed out through the second nozzle 113 to realize the functions of cooling and chip breaking of the rake face near to the tool nose arc, and the other part of the cooling medium is sprayed out through the second internal cooling hole 98 to solve the problem of cooling and lubrication of the flank face near to the tool nose arc. In a transition process of the two contact states, the first hydraulic branch circuit and the second hydraulic branch circuit are communicated simultaneously, and the duration is T2.

Then the time-delay closing coil C2 is switched on, an associated normally closed contact C22 is switched off, the indicator light L1 is extinguished, the electromagnetic coil Y1 is powered off, the first electromagnetic directional valve 6 is reset under the action of a spring and restored to the normally closed state, and at this moment, only the second hydraulic branch circuit is communicated. After the hydraulic circuit is in continuous communication for a time of T3, a time-delay closing coil C3 is switched on, an associated normally open contact C33 is closed, an electromagnetic coil Y3 is switched on, an indicator light L3 is lightened, and a time-delay closing coil C4 starts timing. At this moment, the third electromagnetic directional valve 8 is switched from a normally closed state to a working state, and the hydraulic main circuit is communicated with the third hydraulic branch circuit. The cooling medium passes through the third internal cooling channel 95, one part of the cooling medium passes through the cooling channel in the platen 11 and is sprayed out through the third nozzle 114 to realize the functions of cooling and chip breaking of the minor rake face, and the other part of the cooling medium is sprayed out through the third internal cooling hole 99 to solve the problem of cooling and lubrication of the minor flank face. In a transition process of the two contact states, the second hydraulic branch circuit and the third hydraulic branch circuit are communicated simultaneously, and the duration is T4.

Then the time-delay closing coil C4 is switched on, an associated normally closed contact C44 is switched off, the indicator light L2 is extinguished, the electromagnetic coil Y2 is powered off, the second electromagnetic directional valve 7 is reset under the action of a spring and restored to the normally closed state, and at this moment, only the third hydraulic branch circuit is communicated. After the hydraulic circuit is in continuous communication for a time of T5, a time-delay closing coil C5 is switched on, an associated normally closed contact C55 is switched off, the indicator light L3 is extinguished, the electromagnetic coil Y3 is powered off, and the third electromagnetic directional valve 8 is reset under the action of a spring and restored to the normally closed state. At this moment, the whole-domain turning process of the curved surface component in the condition of the current cutting parameters is completed, the electromagnetic control circuit is reset, and none of the hydraulic branch circuits is communicated. the turning tool is retreated to the initial position, the action process of the hydraulic circuit can be repeated by pressing down the normally open key switch S again before the next turning is started, and the operation is continued until the turning of the curved surface component is completed.

The electromagnetic control system of the hydraulic circuit mainly consists of three branches connected in parallel to a 24V DC power supply, wherein the first branch consists of the normally open key switch S, a normally closed contact C55, the normally closed contact C22, the electromagnetic coil Y1, the indicator light L1, the time-delay closing coil C1, the time-delay closing coil C3 and the time-delay closing coil C5; the normally open key switch S and the normally closed contact C55 are connected in series with the normally closed contact C22, the electromagnetic coil Y1 and the indicator light L1, and the normally closed contact C22, the electromagnetic coil Y1 and the indicator light L1 are connected in parallel with the time-delay closing coil C1, the time-delay closing coil C3 and the time-delay closing coil C5; the second branch consists of a normally closed contact C55, the normally open contact C11, the normally closed contact C44, the electromagnetic coil Y2, the indicator light L2 and the time-delay closing coil C2, wherein the indicator light L2 is connected in series with the normally closed contact C55, the normally open contact C11, the normally closed contact C44 and the electromagnetic coil Y2, and in parallel with the time-delay closing coil C2; the third branch consists of a normally closed contact C55, the normally open contact C33, the electromagnetic coil Y3, the indicator light L3 and the time-delay closing coil C4, wherein the indicator light L3 is connected in series with the normally closed contact C55, the normally open contact C33 and the electromagnetic coil Y3, and in parallel with the time-delay closing coil C4.

The invention claimed is:

1. A control method of an internal cooling system for precision turning, wherein the internal cooling system for precision comprises a hydraulic circuit, an internal cooling turning tool and an electromagnetic control circuit;

the hydraulic circuit comprises a hydraulic main circuit and several hydraulic branch circuits, and the main circuit comprises a hydraulic source with overflow valve (1), a filter (2), a pressure gauge (3), an adjustable throttle valve (4) and an air-cooled water cooler (5), wherein the hydraulic source with overflow valve (1), the filter (2), the adjustable throttle valve (4) and the air-cooled water cooler (5) are connected in sequence through hydraulic hoses, and the pressure gauge (3) is arranged between the filter (2) and the adjustable throttle valve (4); pipelines derived from the air-cooled water cooler (5) are divided into a first hydraulic branch circuit, a second hydraulic branch circuit and a third hydraulic branch circuit, wherein the first hydraulic branch circuit, the second hydraulic branch circuit and the third hydraulic branch circuit are respectively controlled by a first electromagnetic directional valve (6), a second electromagnetic directional valve (7) and a third electromagnetic directional valve (8), and are connected with the hydraulic main circuit through ferrule joints;

a first internal cooling channel (91), a second internal cooling channel (93) and a third internal cooling channel (95) are formed in the internal cooling turning tool (9), and first pipe threads (92), second pipe threads (94) and third pipe threads (96) are respectively formed at the tail parts of the three channels; the pipe threads are matched with external threads at the tail parts of internal cooling sleeves (10), so as to realize the communication between each hydraulic branch circuit and the internal cooling channels of the turning tool;

platen screws are penetrated through screw mounting holes (112) to fix a platen (11) on the internal cooling turning tool (9), and pressing force between the platen (11) and a turning insert (12) is adjusted to ensure that the turning insert (12) is tightly pressed against the internal cooling turning tool (9); a first internal cooling hole (97), a second internal cooling hole (98) and a third internal cooling hole (99) are formed in the tool nose of the internal cooling turning tool (9), and a cooling medium is sprayed out through the internal cooling holes to cool and lubricate the flank face of the turning insert (12); a first nozzle (111), a second nozzle (113) and a third nozzle (114) which are communicated with the internal cooling channels are arranged in the platen (11), and the cooling medium is sprayed out through the nozzles to cool and lubricate the rake face of the turning insert (12);

wherein the method comprises the following steps:

step 1, conducting parameterization representation for cutting edges of the turning tool; obtaining the coordinates of partial data points located on a major cutting edge, a minor cutting edge and a tool nose arc profile of the turning insert (12), and using a cubic non-uniform rational B spline to construct a turning tool cutting edge profile curve passing through each data point;

step 2, analyzing a time-varying contact state related to a tool pose; firstly, adjusting the initial pose of the tool in a workpiece coordinate system according to the actual cutting process of a curved surface; establishing a tool coordinate system, wherein the XOY plane of the coordinate system is located in a cutting plane, the origin of the coordinate system is located at the center of symmetry of a rhombic insert, and the Y axis is collinear with the symmetric axes of the major cutting edge and the minor cutting edge; discretizing the turning tool cutting edge profile curve into a point set $P^o$ in the tool coordinate system; establishing a workpiece coordinate system, wherein the X'OY' plane of the workpiece coordinate system is also located in the cutting plane, the origin of the coordinate system is located at the intersection point of a workpiece rotation axis and a workpiece clamping surface, and the Y' axis is collinear with the workpiece rotation axis; conducting a matrix translation operation to make the turning tool position point, namely the center of the tool nose arc, coincide with the origin of the workpiece coordinate system, and conducting a matrix rotation operation to make the initial included angle between the major cutting edge of the tool and the Y' axis become $\varphi_1$, wherein the value range of $\varphi_1$ is 60°-120°; after the rotation and translation operations, determining a discrete point set $P'$ for the cutting edge profile curve in the workpiece coordinate system by the following formula:

$$P' = \begin{bmatrix} \cos\left(\varphi_1 + \dfrac{k_\theta}{2}\right) & -\sin\left(\varphi_1 + \dfrac{k_\theta}{2}\right) & 0 \\ \sin\left(\varphi_1 + \dfrac{k_\theta}{2}\right) & \cos\left(\varphi_1 + \dfrac{k_\theta}{2}\right) & 0 \\ 0 & 0 & 1 \end{bmatrix} \begin{bmatrix} 1 & 0 & -T_x \\ 0 & 1 & -T_y \\ 0 & 0 & 1 \end{bmatrix} P^o \quad (1)$$

where $k_\theta$ is the included angle between the major cutting edge and the minor cutting edge of the turning tool, $T_x$ is the x-coordinate of the center of the tool nose arc in the tool coordinate system, and $T_y$ is the y-coordinate of the center of the tool nose arc in the tool coordinate system;

secondly, calculating the intersection points of the cutting edges with a machined surface and a work surface, wherein the profile distance between two points is the contact length of the cutting edges in the current tool pose, which changes along with the change of the tool pose in the turning process of a curved surface component; two intersection points are formed between a cutting edge profile and a curved surface profile, wherein the intersection point of the major cutting edge or the adjacent tool nose arc with the curved surface profile is $P_N$, and the intersection point of the minor cutting edge or the adjacent tool nose arc with the curved surface profile is $P_G$, and point $P_N$ is the intersection point of the tool and the work surface; defining an auxiliary straight line according to the geometry of the curved surface component and cutting parameters, wherein the intersection point of the auxiliary straight line and each cutting edge of the turning tool is the intersection point $P_M$ of the tool and the machined surface; determining the slope of the auxiliary straight line by the following formula:

$$k = \tan\left[\theta_i - \arctan\left(\frac{f}{2R - 2ap}\right)\right] \qquad (2)$$

where $\theta_1$ is the included angle between the normal vector of the curved surface and the X' axis in the current tool pose, ap is the cutting depth of the tool, f is the feed rate of the tool in per rotation, and R is the curvature radius of the work surface in the current cutting position;

finally, discretizing a motion track of the tool, and traversing and calculating the contact state of the tool at each discrete tool position point to master the moving rule and moving range of the contact area of the tool in the turning process of the curved surface component;

step 3, decomposing the contact state based on the analysis of the coverage area of the cooling medium; selecting the type of the cooling medium according to the material property of the curved surface component, and adjusting the temperature and flow rate of the cooling medium by the air-cooled water cooler (5) and the adjustable throttle valve (4); dividing the moving range of the whole contact area into three parts in sequence according to the spraying position and spraying range of the cooling medium from the pipeline of each channel, and defining the three parts as contact state 1, contact state 2 and contact state 3 respectively; calculating the cutting durations of the three contact states according to the tool feed speed and the geometrical characteristics of the curved surface component, and recording the cutting durations as $t_1$, $t_2$ and $t_3$ respectively; therefore, the corresponding times after the end of the three contact states are respectively $T1=t_1$, $T3=t_1+t_3$ and $T5=t_1+t_2+t_3$;

step 4, designing an electromagnetic control system oriented to an optimal tool cooling efficiency; completing the action control of the hydraulic circuit based on a designed electromagnetic control system, and pressing down a normally open key switch S, thus an electromagnetic coil Y1 is connected, and an indicator light L1 is lightened; at this moment, the first electromagnetic directional valve (6) is switched from a normally closed state to a working state, and the hydraulic main circuit is communicated with the first hydraulic branch circuit; the cooling medium passes through the first internal cooling channel (91), one part of the cooling medium passes through the cooling channel in the platen (11) and is sprayed out through the first nozzle (111) to realize the functions of cooling and chip breaking of the major rake face, and the other part of the cooling medium is sprayed out through the first internal cooling hole (97) to solve the problem of cooling and lubrication of the major flank face; after a duration T1, a time-delay closing coil C1 is switched on, an associated normally open contact C11 is closed, an electromagnetic coil Y2 is switched on, an indicator light L2 is lightened, and a time-delay closing coil C2 starts timing; at this moment, the second electromagnetic directional valve (7) is switched from a normally closed state to a working state, and the hydraulic main circuit is communicated with the second hydraulic branch circuit; the cooling medium passes through the second internal cooling channel (93), one part of the cooling medium passes through the cooling channel in the platen (11) and is sprayed out through the second nozzle (113) to realize the functions of cooling and chip breaking of the rake face near to the tool nose arc, and the other part of the cooling medium is sprayed out through the second internal cooling hole (98) to solve the problem of cooling and lubrication of the flank face near to the tool nose arc; in a transition process of the two contact states, the first hydraulic branch circuit and the second hydraulic branch circuit are communicated simultaneously, and the duration is T2;

then the time-delay closing coil C2 is switched on, an associated normally closed contact C22 is switched off, the indicator light L1 is extinguished, the electromagnetic coil Y1 is powered off, the first electromagnetic directional valve (6) is reset under the action of a spring and restored to the normally closed state, and at this moment, only the second hydraulic branch circuit is communicated; after the hydraulic circuit is in continuous communication for a time of T3, a time-delay closing coil C3 is switched on, an associated normally open contact C33 is closed, an electromagnetic coil Y3 is switched on, an indicator light L3 is lightened, and a time-delay closing coil C4 starts timing; at this moment, the third electromagnetic directional valve (8) is switched from a normally closed state to a working state, and the hydraulic main circuit is communicated with the third hydraulic branch circuit; the cooling medium passes through the third internal cooling channel (95), one part of the cooling medium passes through the cooling channel in the platen (11) and is sprayed out through the third nozzle (114) to realize the functions of cooling and chip breaking of the minor rake face, and the other part of the cooling medium is sprayed out through the third internal cooling hole (99) to solve the problem of cooling and lubrication of the minor flank face; in a transition process of the two contact states, the second hydraulic branch circuit and the third hydraulic branch circuit are communicated simultaneously, and the duration is T4;

then the time-delay closing coil C4 is switched on, an associated normally closed contact C44 is switched off, the indicator light L2 is extinguished, the electromagnetic coil Y2 is powered off, the second electromagnetic directional valve (7) is reset under the action of a spring and restored to the normally closed state, and at this moment, only the third hydraulic branch circuit is communicated; after the hydraulic circuit is in continuous communication for a time of T5, a time-delay closing coil C5 is switched on, an associated normally closed contact C55 is switched off, the indicator light L3 is extinguished, the electromagnetic coil Y3 is powered off, and the third electromagnetic directional valve (8) is reset under the action of a spring and restored to the normally closed state; at this moment, the whole-domain turning process of the curved surface component in the condition of the current cutting parameters is completed, the electromagnetic control circuit is reset, and none of the hydraulic branch circuits is communicated; the turning tool is retreated to the initial position, the action process of the hydraulic circuit can be repeated by pressing down the normally open key switch S again before the next turning is started, and the operation is continued until the turning of the curved surface component is completed.

2. The control method of the internal cooling system according to claim 1, wherein the electromagnetic directional valves are normally closed two-position two-way valves.

3. The control method of the internal cooling system according to claim 1, wherein the ferrule joints are four-way and are made of stainless steel.

4. The control method of the internal cooling system according to claim 1, wherein the cooling medium sprayed out through the first internal cooling hole (97), the second internal cooling hole (98) and the third internal cooling hole (99) can respectively meet the cooling requirements of the major flank face, the flank face near to the tool nose arc and the minor flank face.

5. The control method of the internal cooling system according to claim 1, wherein the characteristic point coordinates of the cutting edge profile are measured by an optical microscope.

6. The control method of the internal cooling system according to claim 1, wherein the adjusting range of the opening of the adjustable throttle valve (4) is 0.5-1.

7. The control method of the internal cooling system according to claim 1, wherein the adjusting range of the liquid outlet temperature of the air-cooled water cooler (5) is 0° C.-50° C.

8. The control method of the internal cooling system according to claim 1, wherein the electromagnetic control system of the hydraulic circuit mainly consists of three branches connected in parallel to a 24V DC power supply, wherein the first branch consists of the normally open key switch S, a normally closed contact C55, the normally closed contact C22, the electromagnetic coil Y1, the indicator light L1, the time-delay closing coil C1, the time-delay closing coil C3 and the time-delay closing coil C5; the normally open key switch S and the normally closed contact C55 are connected in series with the normally closed contact C22, the electromagnetic coil Y1 and the indicator light L1, and the normally closed contact C22, the electromagnetic coil Y1 and the indicator light L1 are connected in parallel with the time-delay closing coil C1, the time-delay closing coil C3 and the time-delay closing coil C5; the second branch consists of a normally closed contact C55, the normally open contact C11, the normally closed contact C44, the electromagnetic coil Y2, the indicator light L2 and the time-delay closing coil C2, wherein the indicator light L2 is connected in series with the normally closed contact C55, the normally open contact C11, the normally closed contact C44 and the electromagnetic coil Y2, and in parallel with the time-delay closing coil C2; the third branch consists of a normally closed contact C55, the normally open contact C33, the electromagnetic coil Y3, the indicator light L3 and the time-delay closing coil C4, wherein the indicator light L3 is connected in series with the normally closed contact C55, the normally open contact C33 and the electromagnetic coil Y3, and in parallel with the time-delay closing coil C4.

* * * * *